United States Patent
Manion et al.

(10) Patent No.: US 9,268,547 B2
(45) Date of Patent: *Feb. 23, 2016

(54) CONDITIONAL LOGIC FOR DELIVERING COMPUTER-EXECUTABLE PROGRAM INSTRUCTIONS AND CONTENT

(75) Inventors: Joshua R. Manion, Los Altos, CA (US); Joshua C. Goodwin, Mountain View, CA (US); Bahtiyor M. Khodjaev, Sunnyvale, CA (US)

(73) Assignee: Ensighten, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,282

(22) Filed: Nov. 28, 2011

(65) Prior Publication Data

US 2012/0072488 A1 Mar. 22, 2012

Related U.S. Application Data

(63) Continuation-in-part of application No. 12/685,268, filed on Jan. 11, 2010, now Pat. No. 8,996,986.

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
(Continued)

(52) U.S. Cl.
CPC .............. *G06F 8/61* (2013.01); *G06F 17/3089* (2013.01)

(58) Field of Classification Search
CPC .............................. G06F 17/3089; G06F 8/61
USPC .................................. 715/234; 709/203, 234
See application file for complete search history.

(56) References Cited

U.S. PATENT DOCUMENTS 6,078,956 A 6/2000 Bryant et al.
6,138,237 A 10/2000 Ruben et al.
(Continued)

FOREIGN PATENT DOCUMENTS

EP 1105790 A1 6/2001
EP 1108309 A1 6/2001
(Continued)

OTHER PUBLICATIONS

Peterson, Eric T., "The Coming Revolution in Web Analytics," copyright 2009, pp. 1-18, SAS Institute Inc.
(Continued)

*Primary Examiner* — Manglesh M Patel
*Assistant Examiner* — Nicholas Hasty
(74) *Attorney, Agent, or Firm* — Banner & Witcoff, Ltd.

(57) ABSTRACT

A tag/content management system delivers customized content and/or program instructions to a user terminal. The system may deliver several groups of program executable instructions, including instructions that are global to all web domains controlled by a client server and those that are specific to a web page/group of web pages. The program instructions and/or content may also be delivered to the user terminal based on the evaluation of one or more conditions, including those related to the location of the user terminal, various HTTP header fields, the presence of specific HTML objects in a web page accessed by the user terminal, and the screen resolution of the user terminal, among other things.

25 Claims, 6 Drawing Sheets

(51) Int. Cl.
G06F 17/27 (2006.01)
G06F 17/28 (2006.01)
G06F 9/445 (2006.01)
G06F 17/30 (2006.01)

(56) References Cited

U.S. PATENT DOCUMENTS

| | | |
|---|---|---|
| 6,487,604 B1 | 11/2002 | Rochford et al. |
| 6,633,312 B1 | 10/2003 | Rochford et al. |
| 6,654,803 B1 | 11/2003 | Rochford et al. |
| 6,691,282 B1 | 2/2004 | Rochford et al. |
| 7,389,343 B2 | 6/2008 | Busch et al. |
| 7,584,435 B2 | 9/2009 | Bailey et al. |
| 7,587,433 B2 | 9/2009 | Peleg et al. |
| 7,620,948 B1 * | 11/2009 | Rowe et al. .................. 717/171 |
| 7,885,942 B2 | 2/2011 | Chand et al. |
| 7,890,451 B2 | 2/2011 | Cancel et al. |
| 7,941,394 B2 | 5/2011 | Error |
| 8,140,963 B2 * | 3/2012 | Watson ........................ 715/230 |
| 8,452,790 B1 | 5/2013 | Mianji |
| 8,713,424 B1 | 4/2014 | Kuhn et al. |
| 2002/0124076 A1 | 9/2002 | Lindstrom-Tamer |
| 2002/0133575 A1 | 9/2002 | Cidon et al. |
| 2003/0097421 A1 | 5/2003 | Wille et al. |
| 2003/0154442 A1 | 8/2003 | Papierniak |
| 2004/0199605 A1 | 10/2004 | LaCroix et al. |
| 2005/0065855 A1 | 3/2005 | Geller |
| 2005/0209863 A1 * | 9/2005 | Presler-Marshall et al. ...... 705/1 |
| 2007/0011304 A1 | 1/2007 | Error |
| 2007/0016575 A1 | 1/2007 | Hurst-Hiller et al. |
| 2007/0112856 A1 | 5/2007 | Schram et al. |
| 2007/0244650 A1 | 10/2007 | Gauthier |
| 2007/0288247 A1 | 12/2007 | Mackay |
| 2007/0299743 A1 | 12/2007 | Staib et al. |
| 2007/0299964 A1 | 12/2007 | Wong et al. |
| 2008/0040473 A1 | 2/2008 | Larsson et al. |
| 2008/0052278 A1 | 2/2008 | Zlotin et al. |
| 2008/0059889 A1 | 3/2008 | Parker et al. |
| 2008/0086454 A1 | 4/2008 | Bahadori et al. |
| 2008/0183858 A1 | 7/2008 | Error |
| 2008/0184116 A1 | 7/2008 | Error |
| 2008/0189281 A1 | 8/2008 | Cancel et al. |
| 2008/0201242 A1 | 8/2008 | Minnis et al. |
| 2008/0201643 A1 | 8/2008 | Nagaitis et al. |
| 2008/0215631 A1 * | 9/2008 | Abraham et al. ........... 707/104.1 |
| 2008/0228819 A1 | 9/2008 | Minnis et al. |
| 2008/0270471 A1 | 10/2008 | Schon |
| 2009/0024748 A1 | 1/2009 | Goldspink et al. |
| 2009/0076899 A1 * | 3/2009 | Gbodimowo ................... 705/14 |
| 2009/0100139 A1 | 4/2009 | Purdy et al. |
| 2009/0100154 A1 | 4/2009 | Stevenson et al. |
| 2009/0112918 A1 * | 4/2009 | Terrell ........................ 707/102 |
| 2009/0177796 A1 * | 7/2009 | Falk et al. ..................... 709/238 |
| 2009/0182718 A1 * | 7/2009 | Waclawik et al. ................. 707/3 |
| 2009/0193497 A1 | 7/2009 | Kikuchi et al. |
| 2009/0204478 A1 | 8/2009 | Kaib et al. |
| 2009/0248484 A1 | 10/2009 | Surendran et al. |
| 2009/0287713 A1 | 11/2009 | Anderson et al. |
| 2009/0292677 A1 * | 11/2009 | Kim ................................. 707/3 |
| 2009/0327353 A1 | 12/2009 | Zhuge et al. |
| 2009/0328069 A1 | 12/2009 | Lala |
| 2010/0017384 A1 | 1/2010 | Marinescu |
| 2010/0030894 A1 | 2/2010 | Cancel et al. |
| 2010/0037177 A1 | 2/2010 | Golsorkhi |
| 2010/0049627 A1 | 2/2010 | Geppert et al. |
| 2010/0235494 A1 | 9/2010 | Sood et al. |
| 2010/0235749 A1 * | 9/2010 | Ratnakar ...................... 715/733 |
| 2010/0251128 A1 | 9/2010 | Cordasco |
| 2010/0281389 A1 | 11/2010 | Hutchinson |
| 2010/0318976 A1 | 12/2010 | Everly et al. |
| 2010/0332962 A1 | 12/2010 | Hammer et al. |
| 2011/0035486 A1 | 2/2011 | Seolas et al. |
| 2011/0185016 A1 | 7/2011 | Kandasamy et al. |
| 2011/0302485 A1 | 12/2011 | D'Angelo et al. |
| 2012/0030559 A1 | 2/2012 | Manion et al. |
| 2013/0073401 A1 | 3/2013 | Cook |
| 2014/0089782 A1 | 3/2014 | Cook |
| 2014/0137006 A1 | 5/2014 | Goodwin et al. |

FOREIGN PATENT DOCUMENTS

| | | |
|---|---|---|
| EP | 1108312 A1 | 6/2001 |
| EP | 1145167 A2 | 10/2001 |
| EP | 1264261 B1 | 11/2005 |
| EP | 1997041 A1 | 12/2008 |
| EP | 1094635 B1 | 8/2009 |
| EP | 2141614 | 1/2010 |
| EP | 2199969 | 6/2010 |
| GB | 2412805 A | 10/2005 |
| WO | 0079374 A1 | 12/2000 |
| WO | 0103374 A1 | 1/2001 |
| WO | 0103378 A1 | 1/2001 |
| WO | 0103023 A3 | 8/2001 |
| WO | 2008024706 | 2/2008 |
| WO | 2008137522 | 11/2008 |
| WO | 2010119379 | 10/2010 |
| WO | 2011084843 | 7/2011 |

OTHER PUBLICATIONS

Manion, Josh, "Data Collection Part 1-Single Methodologies," retrieved Nov. 6, 2009, pp. 1-3, Stratigent, LLC.
Resig, John. Website: www.ejohn.org, retrieved Feb. 18, 2010.
Website: www.tealium.com, retrieved Jan. 26, 2010.
Website: www.monetate.com, retrieved Feb. 22, 2010.
Website: www.speed-trap.com, retrieved Jan. 26, 2010.
Website: www.tagman.com, retrieved Jan. 26, 2010.
Website: www.sitetagger.co.uk, retrieved Jan. 26, 2010.
Crockford, Douglas, "The JavaScript Minifier," Dec. 4, 2003, pp. 1-2, website: http://www.crockford.com/javascript/jsmin.html.
Crockford, Douglas, "PHP Adaptation of JSMin" JSMIN_lib.pho (for PHP 4, 5), retrieved on Jan. 26, 2010, pp. 1-10, website: http://javascript.crockford.com/jsmin2.php.txt.
Website: http://developer.yahoo.com/yui/, on Feb. 18, 2010, pp. 1-2.
Website: www.dojotoolkit.org, retrieved Feb. 22, 2010, p. 1.
Website: http://download.dojotoolkit.org/release-1.4.0/dojo.js.uncompressed.js, retrieved Feb. 22, 2010.
Website: www.code.google.com/p/jquelyjs/downloads/detail?name=jquery-1.3.2.js, retrieved Jan. 26, 2010.
Website: www.jquery.com, retrieved Jan. 26, 2010, pp. 1-2.
Website: www.magiq.com, retrieved Feb. 22, 2010, pp. 1.
Copy of International Search Report & Written Opinion from PCT Application No. PCT/US10/61997, mailed Mar. 3, 2001.
Chenghsien Yu, et al. "A Study of Using Automatic Text Indexing to Analyze Web Browsing Behavior" Proceedings of the 5" World Congress on Intelligent Control and Automations, Jun. 15-19, 2004, Hangzhou, P.R. China.
Yong Tan, et al. "Analysis of a least recently used cache management policy for web browsers" Operations Research, v. 50, n. 2, p. 345-57, Jan., 1999.
Christian von der Weth, et al.,"COBS: Realizing Decentralized Infrastructure for Collaborative Browsing and Search", 2011 Internationl Conference on Advanced Information Networking and Applications, (AINA 2011), p. 617-24, 2011, Mar. 22-25, 2011.
Hui Chen, et al., "Business-to-Consumer Mobile Agent- Based Internet Commerce System (MAGICS)", IEEE Transactions on Systems, Man, And Cybernetics—Part C: Applications and Reviews, vol. 37, No. 6, pp. 1174-1189, Nov. 1, 2007.
W. Ulam, et al. "Technical considerations in remote LIMS access via the World Wide Web", J Autom, Methods Manag. Chem. (UK); v 2005, n. 4, p. 217-22, Dec. 11, 2005.
Victor Pascual-Cid, "An Information Visualisation System for the Understand of Web Data", VAST'08—IEEE Symposium on Visual Analytics Science and Technology, Proceedings, p. 183-184, Oct. 21, 2008.
Alison Lee, et al. "Browsers to Support Awareness and Social Interaction", IEEE Computer Graphics and Applications, v 24, n. 5, p. 66-75, Sep. 1, 2004.

(56) References Cited

OTHER PUBLICATIONS

Wikipedia, the free encyclopedia webpage http://en.wikipedia.org/wiki/List_of HTTP_header_fields#Requests, Aug. 11, 2011, 7 pp. Wikimedia Foundation, Inc.
Non-Final Office Action mailed Mar. 14, 2012, U.S. Appl. No. 12/685,268 filed Jan. 11, 2010, 32 pages.
Final Office Action mailed Sep. 6, 2012 for U.S. Appl. No. 12/685,268 filed Jan. 11, 2010, 21 pages.
Sep. 18, 2014—(PCT) International Search Report—App No. PCT/US 14/28930, 11 pages.
Nov. 3, 2014—(EP) Search Report—App No. 11853671.3—1870/2659367 PCT/US2011067870.
Phu H Phung et al, "Lightweight self-protecting JavaScript", Mar. 10-12, 2009 Sydney, Australia, © 2009 ACM, pp. 47-60.
2014 Nov. 5, 2014—(US) Final Rejection—U.S. Appl. No. 13/623,025.
Mar. 14, 2012—(US) Non-Final Office Action—U.S. Appl. No. 12/685,268.
http://blog.intlock.com/my-google-tag-manager-wishlist/#more-1113, blog entry dated Dec. 19, 2012.
http://tealium.com/blog/tag/universal-tag/p./2/, blog entry posted Aug. 8, 2011.
Tag Failed to Load (NPL: http://stackoverflow.com/questions/538745/how-to-tell-if-a-script-tag-failed-to-load), entry Posted Feb. 2009.
Sep. 6, 2012—(US) Final Office Action—U.S. Appl. No. 12/685,268.
European Search Report dated Jun. 2, 2014, U.S. Appl. No. 10842752.7—1954/2524317 PCT/US2010061997, 9 pages.
2009 Seventh Annual Communication Networks and Services Research Conference, "Workload Characterization of a Large Systems Conference Seb Server", Aniket Mahanti, et al., © 2009 IEEE, pp. 55 through 64.
Apr. 8, 2015—(US) Non-Final Office Action—U.S Appl. No. 13/843,849, 50 pages.
Jun. 9, 2015—(US) Non-Final Office Action—U.S Appl. No. 14/030,325.
Nov. 18, 2015—(US) Non Final Rejection—U.S. Appl. No. 14/856,053.
HTML5 Specification Jan. 22, 2008.
Provisional U.S. Appl. No. 61/601,375 Inventor Goodwin Assignee Ensighten.
Dec. 3, 2015—(US) Notice of Allowance—U.S. Appl. No. 14/030,325.
Jun. 8, 2015—(US) Notice of Allowance—U.S. Appl. No. 13/623,025.
http://econsultancy.conn/reports/tag-management-buyers-guide, published Jun. 2012, © Econsultanc.com Ltd. 2012, 46 pages.

* cited by examiner

CONDITIONAL LOGIC FOR DELIVERING COMPUTER-EXECUTABLE PROGRAM INSTRUCTIONS AND CONTENT

CROSS REFERENCE TO RELATED APPLICATIONS

This application is a continuation-in-part of U.S. application Ser. No. 12/685,268, entitled, "Enhanced Delivery of Content and Program Instructions," filed Jan. 11, 2010, which is herein incorporated by reference in its entirety.

TECHNICAL FIELD

Aspects of the disclosure generally relate to delivery of content and/or program instructions to user terminals based on conditional logic. In particular, various aspects of the disclosure include customizing the program instructions/content delivered to a user terminal based on numerous criteria, including the IP address of the user terminal, the information requested from the user terminal, and/or others.

BACKGROUND

Web pages are generally written in Hypertext Markup Language (HTML). They are written using HTML elements that include "tags" surrounded by angle brackets; information in the tag tells the web browser how to interpret the HTML element (e.g., as text, for insertion of an image into the webpage, for running a script, etc.). These tags can, among other things, include or can load scripts in languages such as JavaScript™.

Meanwhile, web analytics is a field in which data about customers is collected and analyzed for a variety of purposes. To obtain data for web analytics, a population of users visits a web page and/or starts an application that causes certain program instructions to be executed. Usually, data is collected for web analytics purposes through a variety of mechanisms, including the setting of a cookie and/or by running scripts in the HTML document. The scripts may perform a variety of functions, including grabbing variables from the document object model (DOM) and/or sending back an image request to a data collection server either internally or externally hosted.

The program instructions for web analytics are generally authored and run by a variety of vendors, including Omniture™, Google™, Yahoo™, and Webtrends™, among others, in order to be able to capture data such as web page load times, "mouse overs" (i.e., moving a mouse over a particular object on the web page), and the page requestor's IP address. A medium complexity web page may include 5-10 tags with a reference to computer scripts that are run on servers managed by different vendors.

When a marketer associated with an organization decides that she wants to change the code to measure and analyze different features, the process is often tedious and challenging. In many situations, to perform this update, the marketer must create a new custom variable in the program instructions, define what the new variable is, and specify what data the modified code must capture for the web page. Since the marketer is generally not skilled in how to perform these modifications, she must interface with her information technology (IT) department or other similar agency. Sometimes, even the IT department may not adequately understand the syntax of the web analytics program instructions to properly modify the code, especially given that the myriad web analytics vendors, advertisers, survey researchers, and marketers all have their own custom computer code for effectuating the collection of data for analysis. In other situations, the IT department may not have the appropriate bandwidth to modify the code for deployment on schedule (e.g., for an advertisement campaign deadline, etc). These problems are only exacerbated when a client's website has many pages and/or many different types of program instructions for collecting various data about a user.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable media, and apparatuses for systematically managing the delivery of program instructions and content based on predefined conditions.

With another aspect of the disclosure, the delivery of program instructions may be based on predefined rules related to received data, location, time, and other factors.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, there are problems associated with the delivery of program instructions for capturing data for use in areas such as web analytics and/or the delivery of customized content to individuals. A more systematic approach to deploying content and program executable instructions is needed to avoid the errors/latencies involved with the way that present methods work.

In accordance with various aspects of the disclosure, methods, computer-readable media, and apparatuses are disclosed in which an entity manages the delivery of content and program instructions that have been customized for each individual and/or web page. This entity (e.g., a web consulting company) may use aspects of the disclosure to route customized content/instructions to a web browser and/or other computer applications. In general, aspects of the disclosure may be used to manipulate existing objects and add new objects to web pages. Within this context, an object may include both visual and non-visual elements on a web page. As part of the content/instruction delivery vehicle, a front-end user interface may facilitate a non-technical user to describe and implement object creation and manipulation. To provide these services, the entity may take advantage of both internal and external computing and storage capabilities. One example of program instructions delivered to a web browser and/or other application includes those related to initiate the capture of web analytics data when a user terminal accesses a client web page. This collected data may include the name of the web page visited, the download time of the web page, a setting of a cookie for the web page, and the movement of a mouse over a particular object (i.e., "mouse overs") on a web page. In addition, content such as advertisements, modified images, buttons, and other graphics may be customized to a particular user through this service.

Certain embodiments of this disclosure allow for a content/tag management system/method/program executable instructions that is/are referenced with a single line of computer code that is inserted as a single tag and references a JavaScript™ file. The execution of program instructions in the JavaScript™ file may take care of all tag management, updates, configuration changes, and any other customizations that clients may wish to perform. Third-party vendors may be removed from a client website to allow the manager to take responsibility for delivering the correct program instructions/content at the correct time.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
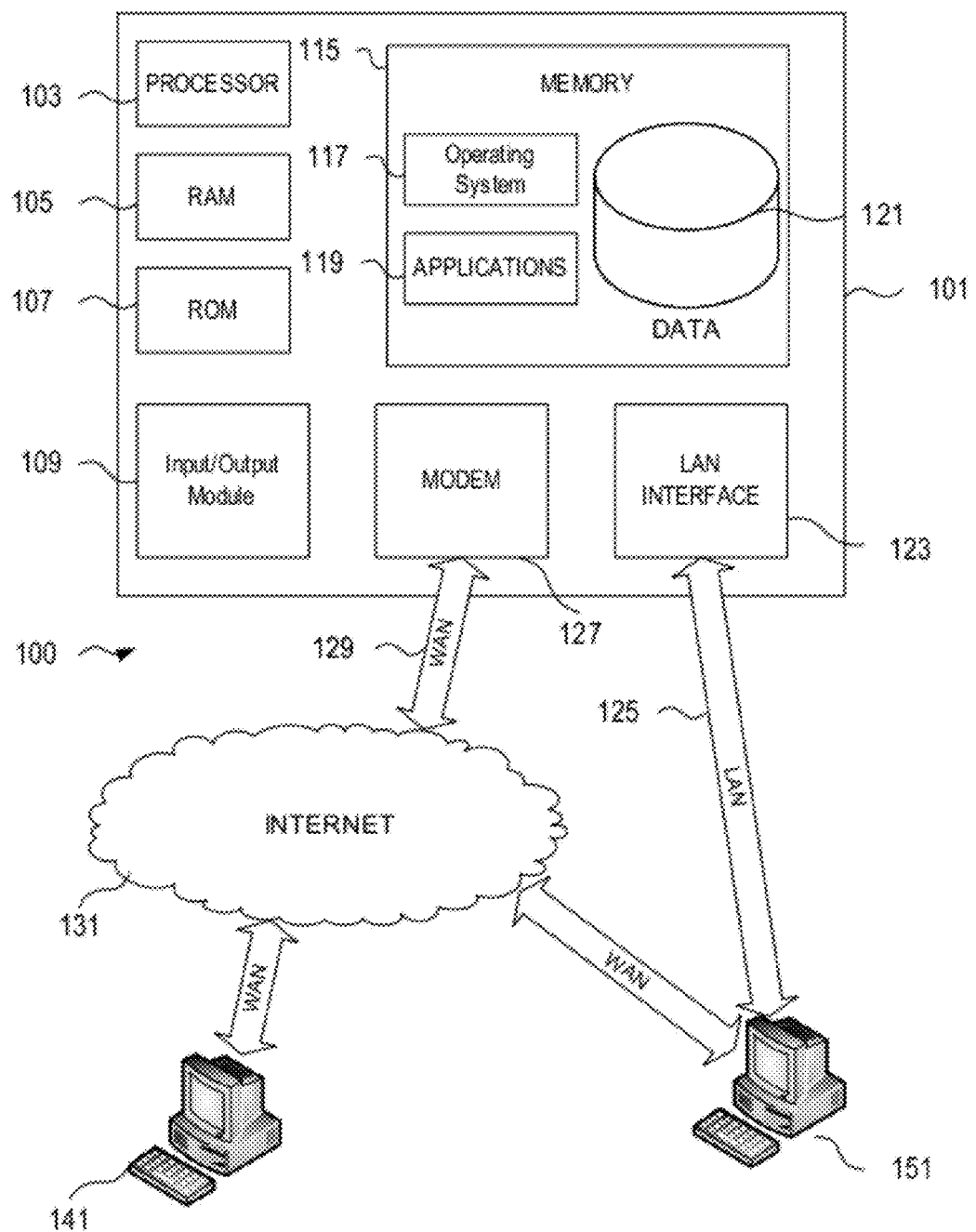
FIG. 1 shows an illustrative operating environment in which various aspects of the disclosure may be implemented.

FIG. 1 illustrates a block diagram of a tag/content manager 101 (e.g., a computer server) in communication system 100 that may be used according to an illustrative embodiment of the disclosure. The manager 101 may have a processor 103 for controlling overall operation of the manager 101 and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 to provide instructions to processor 103 for enabling manager 101 to perform various functions. For example, memory 115 may store software used by the manager 101, such as an operating system 117, application programs 119, and an associated database 121. Processor 103 and its associated components may allow the manager 101 to run a series of computer-readable instructions to deploy program instructions according to the type of request that the manager receives. For instance, if a client requests that program instructions for capturing mouse movements for complete session replay be executed, manager 101 may transmit the appropriate instructions to a user's computer when that user visits the client's website.

The manager 101 may operate in a networked environment supporting connections to one or more remote computers, such as terminals 141 and 151. The terminals 141 and 151 may be personal computers or servers that include many or all of the elements described above relative to the manager 101. Alternatively, terminal 141 and/or 151 may be part of a "cloud" computing environment located with or remote from manager 101 and accessed by manager 101. The network connections depicted in FIG. 1 include a local area network (LAN) 125 and a wide area network (WAN) 129, but may also include other networks. When used in a LAN networking environment, the manager 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, File Transfer Protocol (FTP), Hypertext Transfer Protocol (HTTP) and the like is presumed.

Additionally, an application program 119 used by the manager 101 according to an illustrative embodiment of the disclosure may include computer executable instructions for invoking functionality related to delivering program instructions and/or content.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
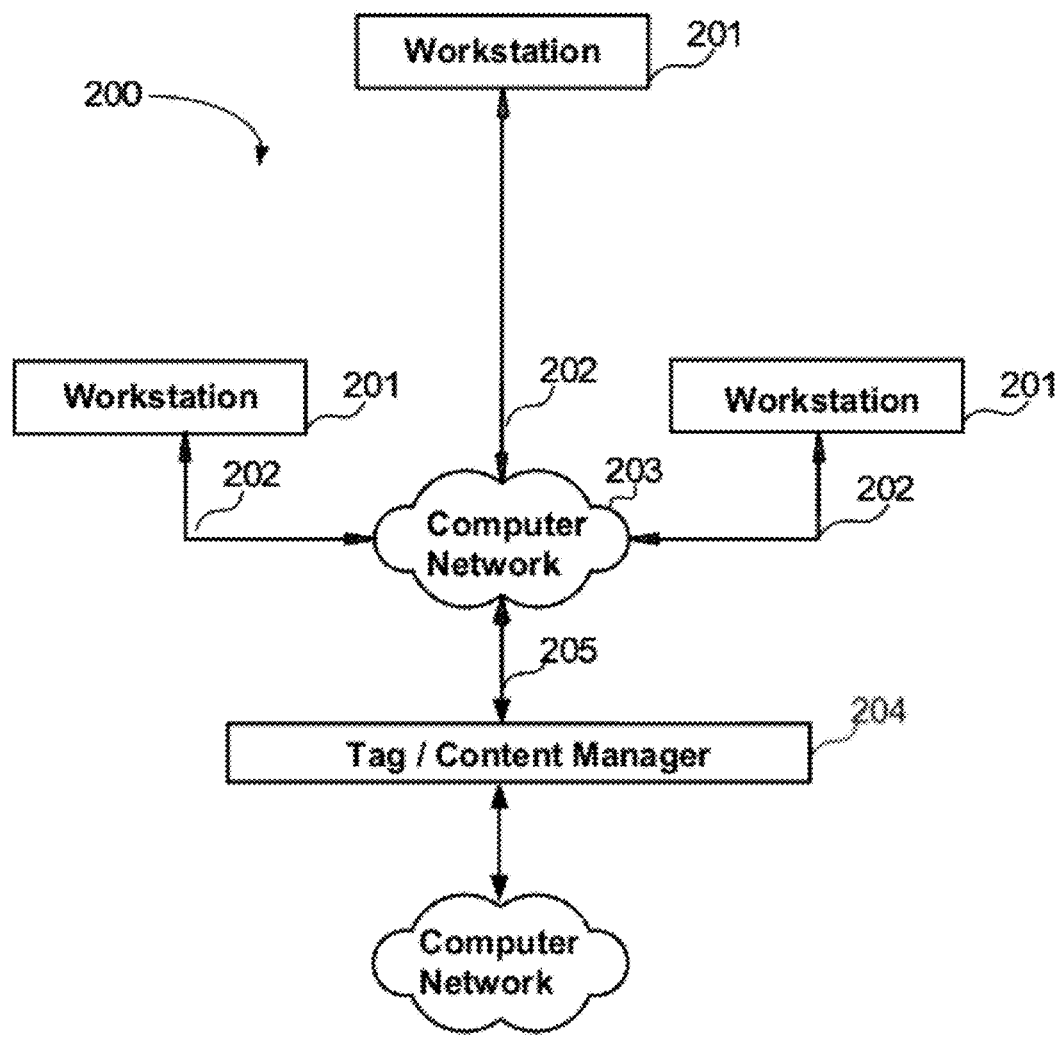
FIG. 2 is an illustrative block diagram of workstations and servers that may be used to implement the processes and functions of certain aspects of the disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to tag/content manager 204. In certain embodiments, workstations 201 may be different storage/computing devices for storing and delivering client-specific program instructions or in other embodiments workstations 201 may be user terminals that are used to access a client website and/or execute a client-specific application. In system 200, manager 204 may be any suitable server, processor, computer, or data processing device, or combination of the same. Throughout this disclosure, tag/content manager 204 will be used to reference both the server/terminal that stores program instructions for tag/content management and the tag/content management program instructions themselves.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Figure 3:
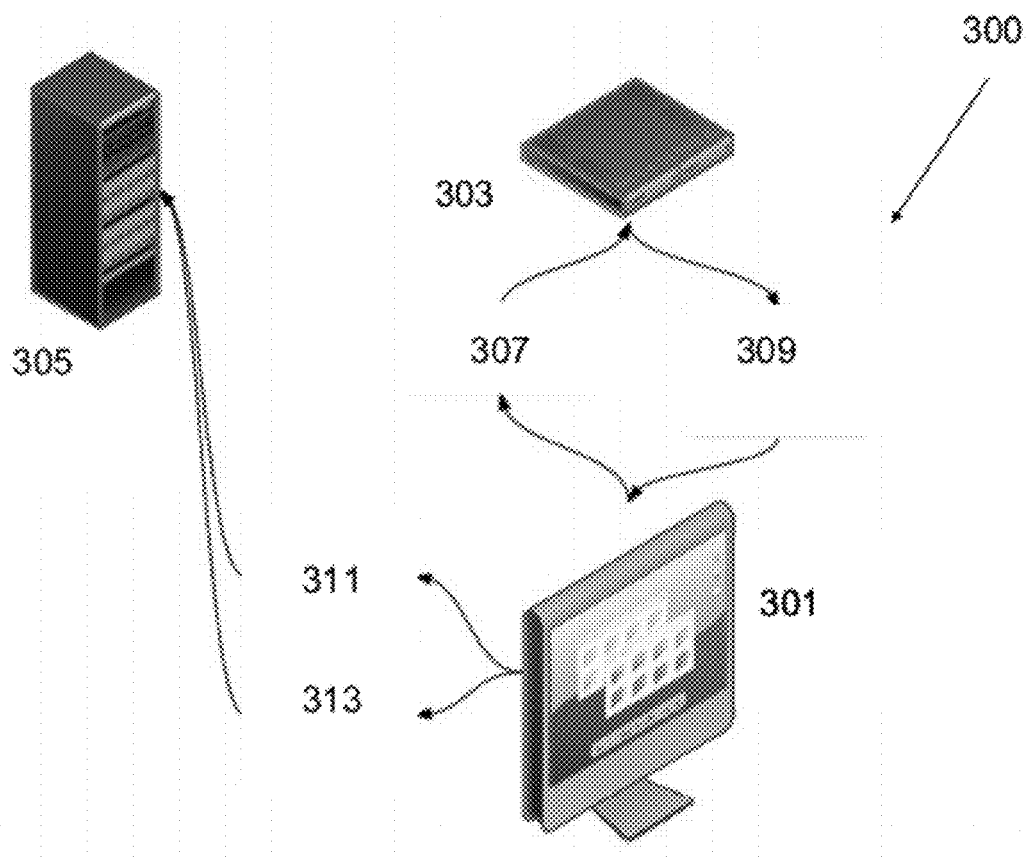
FIG. 3 shows a tag/content management system operating in a network in accordance with certain aspects of the disclosure.

FIG. 3 shows a tag/content management system operating in a network in accordance with certain aspects of the disclosure. System 300 includes a user terminal 301, a client server 303, and a cloud computing facility 305. An individual may use user terminal 301 to start a non-browser based client application (e.g., flash application, desktop applications built in Adobe™ Integrated Runtime (AIR)) and/or browse a web page on a client server 303. A client server 303 (i.e., web server) may be a computing device (e.g., computing device 101) operated by a company, school, university, or individual, among others, to provide products/services to the user terminal 301 via the internet. Meanwhile, the cloud computing facility 305 may represent a collection of network resources for storage and computing. The tag/content manager 204 may operate on the cloud 305. These resources may be located at a site local to or remote from the client server 303. Generally, when extra storage space is required on the cloud 305, tag/content manager 204 may request the space "on demand."

The arrows interconnecting user terminal 301, client server 303, and cloud 305 indicate the method performed by network 300 in accordance with certain embodiments of the disclosure. The method may start at step 307 where the user terminal 301 requests a web page from the client server 303. Upon receiving such a request, client server 303 may return the web page (e.g., an HTML page) to the user terminal 301 in step 309. The HTML web page returned to user terminal 301 may include a tag statement that references the location of the tag/content manager 204 within cloud 305. An example tag statement may be as follows:

<script src="//INSERT PATH OF TAG/CONTENT
MANAGER FOR CLIENT"type="text/javas-
cript"></script> (A)

Of course, variations of this tag may be possible for a variety of reasons; for example, the script referenced may not be written in JavaScript™, the website may require secure connections (e.g., via HTTPS://), etc. Notice that the above line of code may reference a tag/content manager 204 for a particular client web server. For instance, a different JavaScript™ program may exist on cloud 305 for the CNN website versus one for the FOX News website. In other embodiments, the same tag manager 204 may be used for all web domains.

The tag line shown in (A) may be placed into the header, body, footer, or combinations of locations of the HTML source file for a particular web page accessed by user terminal 301. In certain embodiments, the tag line shown in (A) may be placed in the header to allow the tag line to execute early on during the loading of the web page accessed by user terminal 301. Generally, when a request for a web page is made by a user terminal 301, the entire HTML page may be downloaded to the terminal 301. Then a parser within the browser of user terminal 301 may parse each element (head, body, footer) of the HTML file into a document object by using the hierarchical HTML structure described in the document object model (DOM). Once parsed, the document objects of the HTML file may be programmatically accessed quickly and easily.

When the code in (A) executes, the method then moves to step 311 where the user terminal 301 may request the tag manager program 204 from cloud 305. If the tag manager program 204 is written in JavaScript™ (i.e., a client-side script), program 204 may be downloaded into a memory 115 of user terminal 301. Once downloaded onto user terminal 301, manager program 204 may execute for a variety of applications, including data collection for web analytics purposes, content delivery, etc. This tag/content delivery method may optionally move to step 313 where the tag manager program 204 may request program executable instructions specific to the particular web page being viewed by user terminal 301. If web page specific instructions exist on cloud 305, these instructions may also be downloaded into a memory 115 of user terminal 301 for execution. The tag/content manager program 204 and the page specific instructions (if they exist) may both reside at separate locations on the cloud computing facility 305.

In one embodiment, the request of page-specific code in step 313 may involve a two-step process. In the first step, the tag manager program 204 may request a PHP, Perl, Python, C, etc. file from the cloud 305. The requested file may subsequently be used to dynamically generate a JavaScript™ program to the user terminal 301. This two step process may help to ensure that the page-specific JavaScript™ instructions are properly sent to and executed on the appropriate user terminal 301.

Figure 4:
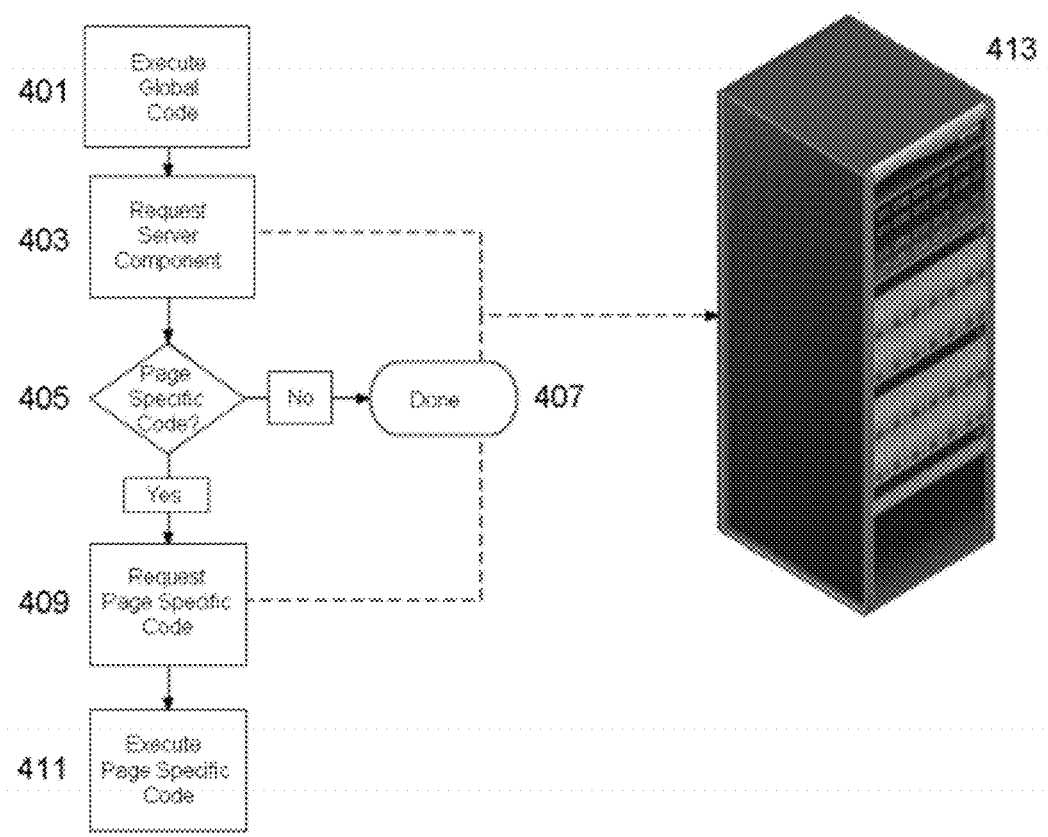
FIG. 4 shows a flow diagram for using a tag/content manager program to execute both global and page specific code in accordance with certain aspects of the disclosure.

FIG. 4 shows a flow diagram for using the tag/content manager program 204 to execute both global and page specific code in accordance with certain aspects of the disclosure. The tag manger program 204 may include "translation capabilities" that would allow generic program instructions to be delivered to a user terminal 301 for a particular data collection/delivery need. For instance, if two vendors use different program instructions to collect data regarding mouse movements, the "translation capability" within tag manager 204 may generate generic program instructions that may be understood/used by both vendors. The tag manager program 204 may also comprise objects that include methods to add and execute program instructions from third party vendors in the correct order. These objects may also include methods to ensure that instructions from third party vendors are not run more than once. The tag manager program 204 may expose these methods in a cross-browser compatible way.

In conventional JavaScript™ implementations, try-catch statements are often used to prevent interference with other JavaScript™ on a web page so that user terminal 305 will not crash if scripts called during the page load are run prematurely or out of order (e.g., when a method in a library of methods is called before the library has finished loading, etc.). In accordance with an aspect of the disclosure, some embodiments obviate the need for try-catch "band-aids" by including functions that require methods to execute only after other methods have loaded or other significant events (parsing, loading of the DOM) have occurred. Through a series of callbacks to methods based on vendor-specific libraries already being loaded, the tag manager program 204 ensures that the program instructions are not executed prematurely or out of order. In addition, the order in which methods are executed can be configured by a user. For instance, a user may define an event in relation to which a method may be required to execute. Alternatively, a user may specify the order in which methods are executed in relation to each other. Clients may define the order of execution for these methods through an interface to the tag/content manager 204. The tag manager program 204 also includes objects that may allow program instructions to be delivered/executed based on significant events that have occurred when a web page is requested by a user terminal 301. For instance, when a web page is requested, program instructions may be executed after the document objects within the HTML file have been parsed by the web browser. In addition, program instructions may be executed after the document objects have been loaded by the web browser. The tag manager program 204 may "listen" for these events and execute program instructions after receiving confirmation that the events have occurred.

As another example, consider an individual who has completed an ecommerce transaction that a client 303 wishes to track on a specific web page. To perform this task, the web analytics code may need certain variables to be available from/to the web page; otherwise the code may not be able to collect the necessary data. For instance, if the web analytics code executes before the total order value is produced by the ecommerce engine, the web analytics code may miss the order. To prevent such scenarios, the tag manager 204 may implement functions that ensure that program instructions are executed in the correct order and at the correct time. As mentioned earlier, the program instructions may be executed in an order that may be controlled by the client.

Once a user terminal 301 has requested the tag manager program 204 and the manager program 204 has been parsed by a browser on user terminal 301, the method in FIG. 4 starts out at step 401 where the tag manager program 204 downloaded to user terminal 301 may execute program instructions that are global to all web domains that fall under the purview of the client web server being accessed. In some embodiments, tag manager 204 may request the global code from a separate location on the cloud 305. In other embodiments, the global code may be directly inserted into tag manager 204. Then the method may move to step 403 where the tag manager program 204 requests a "server component" 413 for page specific instructions for the uniform resource locator (URL) requested by the user terminal 301. The server component may be a server (e.g., workstation 201, computing device 101, etc.) residing within or separate from computing cloud 305. The "server component" may determine if page specific instructions exist for the URL requested in step 405. If the server component determines that no page specific instructions exist for the URL requested, the process may end in step 407. Alternatively, if the server component determines that page specific instructions exist for the URL requested, the tag manager program 204 may request the relevant page specific code in step 409. Once tag manager 204 receives the page specific code, the code may be executed on user terminal 301 in step 411 (after the browser has parsed the new document object generated from the code). As mentioned earlier, it should be noted that page specific content (e.g., modified images, HTML text, etc.) may be requested from the server component 413 on cloud 305 just as easily as page specific code.

Figure 5:
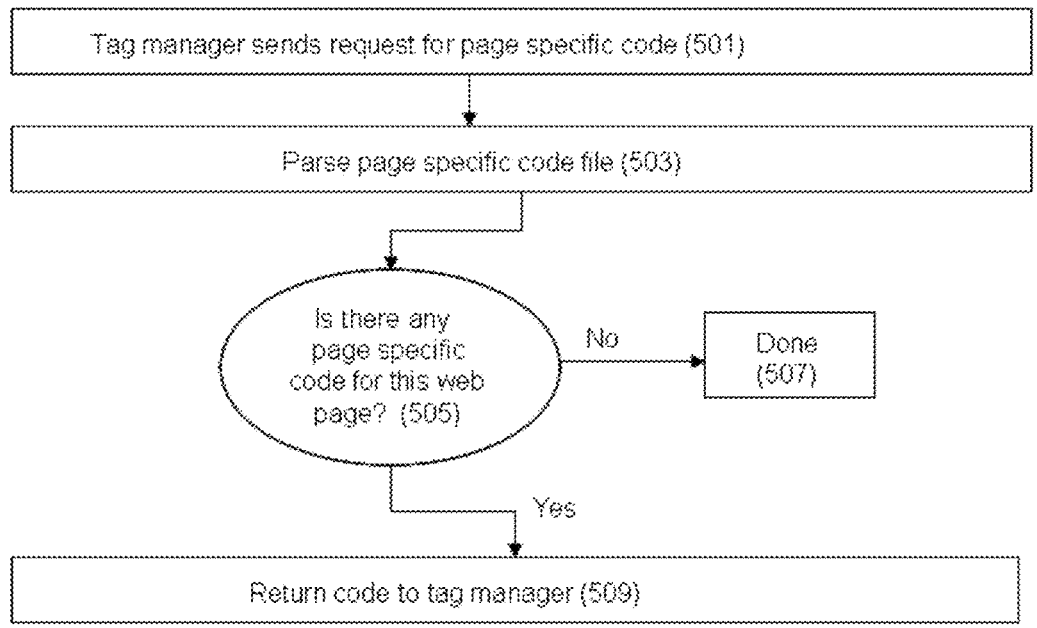
FIG. 5 shows a flow diagram for delivering page specific code to a tag management system in accordance with certain aspects of the disclosure.

FIG. 5 shows a flow diagram for allowing the server component to pass page specific code/content (if the code/content exists) to the tag manager 204 in accordance with certain aspects of the disclosure. The method starts out at step 501 where the tag manager 501 may send out a request for page specific code/content to the server component 413 on cloud 305. Based on the identity of the client and the URL being requested, the server component 413 then may access and parse a file that correlates URLs with their appropriate JavaScript™ files for a particular client in step 503. Based on information in the correlation file, the server component 413 may then decide if there is any page specific code for the URL requested in step 505. If there is no page specific code, the process ends in step 507. If there is page specific code, the code is returned to the tag manager 204 in step 509.

As mentioned earlier, it should be noted that the executable code running on the server component 413 may be written in a server-side scripting language such as PHP. Use of a server-side (rather than client-side) scripting language such as PHP ensures that when the server component 413 is called, code is actually run on the server component 413 itself. The results of the executed code (a JavaScript™ file) may then be sent back to the tag manager program 204. Meanwhile, the files containing data for use by the tag manager 204 and/or the server component 413 may be written in a markup language such as XML.

Figure 6:
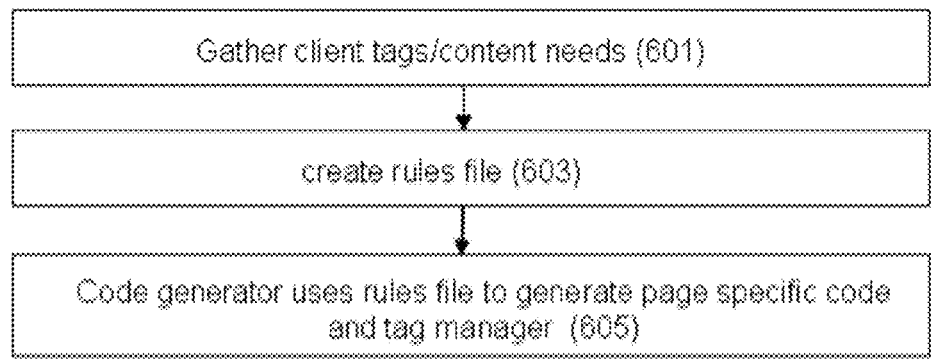
FIG. 6 shows a flow diagram for generating the tag/content manager in accordance with certain aspects of the disclosure.

FIG. 6 shows a flow diagram for generating the tag/content manager program 204 in accordance with certain aspects of the disclosure. As mentioned earlier, tag/content manager 204 may be used for a variety of applications, including collection of data for web analytics, for personalized content distribution, for targeted advertisement campaigns, to collect data about use of a company's software products, etc. To perform these functions, the tag/content manager program 204 may need to know "rules" for delivering executable instructions to a user terminal 301 for each client 303. These "rules" may be based on the needs of a particular client 303. For instance, an online retailer may be interested in recording mouse movements on a specific web page advertising products for sale to gauge the level of interest in those products and for aid in determining future offerings. A news website, on the other hand, may be interested in the number of page loads for each article presented so that popular articles may be more accessible on the website. Further still, either of these clients 303 may wish to present personalized content (e.g., a specific news article, a locally popular article for sale) to the user terminal 301 requesting client 303.

Rules may also include the need for delivering certain program instructions only after others have properly loaded to avoid errors in the loading of a web page. For instance, some rules may simply load JavaScript™ libraries from certain vendors for use by other rules. Other rules require execution of program instructions only in the header, body, and/or footer of a HTML file. Ultimately, the tag manager 204 may incorporate the sophistication of all of these rules through the program instructions directly included in the manager 204 and/or through programs/data that the manager 204 accesses (e.g., page specific code files, page correlation XML files, etc.)

As such, the method in FIG. 6 may start out at step 601 with an entity understanding client needs and gathering existing client tags to execute program instructions from third party vendors. This entity may be in charge of the creation and development of the tag manager 204. Based on these needs, the entity may then in step 603 formalize these needs in a "rules file" that details answers to questions such as what type of data (mouse overs, page loads, etc.) the client would like to collect on his website, whether or not there are any page specific rules, whether or not the rules are to be executed on the completion of significant events (DOM parsing, the execution of other rules, etc.), among others. This "rules file" may be created in any text editor, including an XML editor. Alternatively, a client may directly defines rules through a user interface to the tag/content manager 204 either by writing code into a predefined area in the interface or by using an automatic code generation mechanism accessed through the user interface. The interface/backend may then generate the associated JavaScript™ for the rules without requiring manual client intervention. Once all of the rules have been defined (by whichever process), the backend may generate the XML file for a code generator to process. In this way, the XML rules file may serve as a translation from easy-to-understand rules to computing-language specific code that may be executed as program instructions.

Finally, a code generator program residing in the memory 115 of a computing device 100 associated with the entity may codify the formalized rules into program executable instructions (i.e., into scripts such as JavaScript™, PHP, etc.) in step 605. The code generator program may use the "rules file" to generate the tag manager program 204 and page specific code files used by the tag manager program 204. In addition, the code generator may generate data that correlates client URLs with the name of the program file that should be run when a user terminal 301 tries to access the URL. In some embodiments, the tag/content manager 204 may also manage the collection of data and/or the distribution of content in non-browser applications. For instance, desktop applications built/written in Adobe™ Integrated Runtime (AIR), Adobe™ Flex, Adobe™ Flash, C/C++, Java™, and/or applications for mobile platforms like iPhone™, Android™, Windows Mobile™, and/or Blackberry™ may request a tag/content manager 204 to download and execute a library of program instructions from cloud 305. The execution of the library of program instructions may in turn cause the transmission of a request to an entity responsible for creating the tag manager 204, asking for rules describing what should be done inside of the flash application. In addition to performing tracking/analytics, this paradigm may result in all the functionality associated with the web solution (e.g., creating and modifying elements within the flash application, etc.). This paradigm may also result in the ability to dynamically load configuration during an application run time based on various events (e.g., upon an "Autosave" of a document, opening of a new document, etc.) within the application. For example, in flash applications, in addition to loading a rules file, the system may request additional instructions on how to respond to specific events. These instructions may dynamically be generated upon request based on some predefined logic, piece of existing data, or data provided by the application in the request.

In certain aspects, the server component 413 may include/access executable instructions that govern when computer-readable program instructions and/or content should be sent to a user terminal 301. The conditional logic used to deploy computer-readable program instructions may include one or more simple and/or sophisticated conditions designed to tailor deployment of these instructions for a given scenario. For instance, as mentioned previously, computer-readable program instructions may be sent to a user terminal 301 based on the URL visited by the user terminal 301 (e.g., a webpage hosted by client server 303).

Server component 413 may also analyze the constituent parts of a URL to decide which set of program instructions should be sent to terminal 301. For instance, consider the example URL www.host.com/path/path/file.html?query1=value1&query2=value2#hash. The constituent parts of this URL include the host (www.host.com), path (/path/path), file (file.html), query parameters (query1=value1, and query2=value2), and hash (#hash). Server component 413 may send user terminal 301 a given set of computer-readable program instructions and/or content when any one of these fields, more than one of these fields, or all of these fields matches one or more predetermined values. Each constituent part of a URL may be matched in various ways. In one example, a direct comparison involving an expression to determine if the string of characters for one or more fields matches a predetermined value may be made (e.g., does www.host.com=www.host.com). In another example, a check involving regular expressions (e.g., expressions that are used to match a set of character strings according to specific syntax rules and/or patterns) may be made (e.g., does www\..+\.com=www[any string of characters].com). One of ordinary skill in the art after review of the entirety disclosed herein would recognize that server component 413 may support any number of computing languages involving regular expressions and their associated metacharacters.

As an example, consider a scenario where a client of an entity managing the tag manager program 204 (e.g., a web analytics company, etc.) wishes to deliver the same page specific instructions/content for two different URLs (e.g., www.example.com and example.com). In this case, the host part of the URL may be defined to be a regular expression (e.g., REGEXP: ^(?:www.)?example.com$) that encompasses both www.example.com and example.com to deploy a predetermined set of page specific instructions.

The server component 413 may also deliver computer-readable program instructions/content to the given user terminal 301 based on specific data passed to the server component 413 as part of a regular HTTP request (e.g., step 403 in FIG. 4). In particular, various HTTP headers may be matched using the two comparison techniques discussed above (e.g., direct comparison and those involving regular expressions). For instance, the user-agent, cookie, and/or referrer field (e.g., specifies the last web page user terminal 301 visited) in the HTTP header may be matched to some predetermined values to determine if a given set of program instructions/content should be delivered to a user terminal 301. One of ordinary skill in the art after review of the entirety disclosed herein would recognize that any number of HTTP header fields may be matched to determine delivery of program instructions/content. A partial list of HTTP header fields may be found at http://en.wikipedia.org/wiki/List_of_HTTP_header_fields#Requests, which is herein incorporated by reference in its entirety. One of ordinary skill the art after review of the entirety disclosed herein would recognize that any one of these or other fields may be used with aspects of this disclosure.

For instance, consider an example where a user terminal 301 should receive different program instructions when a given client server 303 is accessed by a mobile browser versus a standard browser on user terminal 301. A client managing client server 303 may determine that this is necessary in order to deliver a smaller or more compatible set of program instructions for a mobile browser, among other reasons. In one scenario, the server component 413 may access page-specific instructions that determines when a URL is accessed by a mobile browser user agent such as an iPhone™ browser. In this example, the server component 413 may target JavaScript™ specifically to iPhone browsers. This ability to target specific program instructions to a particular type of mobile browser may be useful because some of these browsers may not support the same type of JavaScript™ or data collection methodologies as a standard browser.

In another example, assume that the referrer field in the HTTP header is used to provide a given set of program instructions/content to user terminal 301. Assume also that the referrer field identifies a competitor of a client managing client server 303. In this scenario, based on the particular competitor's website visited, the server component 413 may deliver specific content to a user terminal 301 for a client managing client server 303. For instance, the server component 413 may deliver content (e.g., a customized pop-up window) that may explain the benefits of its products over the products of the competitor identified in the referrer field of the HTTP header.

In other aspects, program instructions/content may be transmitted to the user terminal 301 based on data that may exist within a browser located on the user terminal 301. A computing device associated with an entity managing tag manager program 204 may run computer-readable program instructions (e.g., JavaScript™) in an end-user's browser to gather this data. Upon gathering this data, this computing device may retrieve and execute more computer-readable program instructions in any of various ways.

In a first embodiment, the computer-readable program instructions necessary to check if the data gathered in a browser associated with user terminal 301 matches one or more predefined conditions may have been sent to the browser with the initial request for program instructions (e.g., with the initial request for a tag manager program 204 and/or from the page specific instructions transmitted by server component 413). If a match to the conditional is found, a processor associated with the entity managing tag manager program 204 may request program instructions/content that corresponds to the matched conditional. In this way, program instructions may be executed on a user terminal 301 that may result in a computing device associated with the entity managing tag manager program 204 making a request outside of the normal process (e.g., outside of the request for a tag manager program 204 and the request for page-specific instructions by the server component 413.)

To illustrate this first embodiment, consider a scenario where a client associated with client server 303 wishes to track when a user associated with user terminal 301 has successfully completed an event (e.g., such as filling out a form for signing up for an account, etc.) on a webpage associated with the client server 303. In this scenario, a predetermined piece of data (e.g., an HTML object, etc.) may be added to the webpage when the user associated with user terminal 301 completes the form. When the HTML object is generated (e.g., when the web browser on the user terminal 301 determines that the form has been completed), the user terminal 301 may report the form completion event back to a computing device associated with the entity (e.g., a web analytics company, etc.) managing tag manager program 204. The computing device may then return a predefined set of program instructions/content to the user terminal.

In a second embodiment, the check to determine if the data gathered in a browser associated with user terminal 301 matches one or more predefined conditions may be performed at the server component 413. If one or more predefined conditions are met, the server component 413 may transmit a predetermined response (e.g., program instructions, content, etc.) to the user terminal 301.

To illustrate this second embodiment, consider a scenario where a client associated with client server 303 wants to identify which web domain associated with the client is being accessed by users of user terminals 301. Because cookies are set on a domain-by-domain basis and may only be accessed from the domain where the cookie was set, one solution to this problem may include a check to determine if a cookie exists when a given webpage loads on an associated web domain of a client. If a cookie does not exist, a request may be made to server component 413 to determine if the user terminal 301 that loaded the client webpage has a cookie set on the web domain associated with the entity managing tag manager 204 and/or server component 413 (assuming that the entity has only one domain). If a cookie is found for the user associated with user terminal 301, the server component 413 may transmit the cookie value (e.g., as a JavaScript™ variable, etc.) to the user terminal 301. Once received, the cookie may be set on the client web domain. If no cookie is found for the user associated with user terminal 301, the server component 413 may transmit a new cookie value to the user terminal 301. In this way, data (e.g., a message to query whether or not a cookie for a given user associated with a user terminal 301 has been set, etc.) may be sent to the server component 413 and the server component 413 may perform a conditional check to respond with a preexisting or new cookie for a user of user terminal 301.

One of ordinary skill in the art after review of the entirety disclosed herein would recognize that data stored in a web browser associated with user terminal 301 for matching various conditions may include a wide variety of things, including data related to conditionals based on which HTML elements/objects exist on a webpage accessed by the user terminal 301 and data related to conditionals based on information gathered from the web browser itself. In particular, data related to conditionals based on which HTML elements exist on a webpage accessed by the user terminal 301 may include data that answers questions such as "does a specified HTML element exist?" and/or "does a specified HTML element have some particular property or set of properties?", among other things. Data related to conditionals based on information gathered from the web browser itself includes screen resolution of the user terminal 301, the JavaScript™ (or other computing language) version used by user terminal 301, the Flash™ version used by user terminal 301, etc. In some aspects, all properties of HTML elements may be available to the web analytics environment (e.g., JavaScript™-based, etc.) discussed herein and as a web browser supports new HTML element types and properties, new conditionals may be created to analyze these element types/properties. In other words, any data that may be collected from a user terminal 301 (e.g., a device loading a web page, running an iOS™ application, etc.) may be used in creating a conditional.

As an example, consider a case in which a client associated with client server 303 wants to send different JavaScript™ program instructions based on what version of JavaScript™ a browser stored on user terminal 301 supports. If a check to determine which JavaScript™ version is supported by a browser reveals an older version of JavaScript™, the user terminal 301 may request computer-readable program instructions from server component 413 that define functions in a newer version of JavaScript™. This process may allow a client associated with client server 303 to make sure that a standard set of JavaScript™ functions are available on all of the webpages associated with the client.

In yet other aspects, program instructions/content may be transmitted to the user terminal 301 based on data acquired from an external data source. A computing device associated with the entity managing tag manager program 204 may gather data from sources outside of the entity's control via application programming interfaces (APIs) associated with the external data sources. A conditional match may then be performed based on the external data, which may include data from an analytics tool associated with a client managing client server 303, data from databases associated with a client managing client server 303, and data from a third party (e.g., an end-user's geolocation as ascertained by a third party application that matches IP addresses to geographic locations). As an example, if an external data source that maps IP ranges to specific geographic locations is accessed, a computing device associated with an entity managing tag manager program 204 may send program instructions and/or content to user terminals 301 in predetermined geographic regions.

As another example, consider a scenario where a client associated with client server 303 wishes to determine how many times a rule has been executed. For instance, a client associated with client server 303 may use website optimization tools that would test to determine if various versions of the same element perform differently (e.g., answering the question of a preferred color for a "sign up" button located on their website). Because running a test to determine the answer to these types of questions costs money, clients associated with client servers 303 may calculate how many test cases they need to reach statistical significance and decide to perform only those number of tests to reach statistical significance. Data related to identifying the number of times that a rule for tests such as the determination of a color associated with a "sign up" button may be stored in an external data source. A computing device associated with the entity managing tag manager program 204 may retrieve this data from the external data source and may use the data to determine if program instructions for performing the test should be sent to user terminal 301 (e.g., if the rule for determining the color associated with a "sign up" button has run less times than are needed for statistical significance.)

The aforementioned ways are merely illustrative embodiments of ways in which content/program instructions may be delivered to user terminals 301 based on one or more predefined conditions (e.g., time at which the request is made, geographic region, language preferences, maximum/minimum number of delivery instances, etc.) that are evaluated either at computing devices located at the entity managing tag manager program 204 and/or at the user terminals 301 themselves. For instance, an example of a time-based condition includes a scenario in which a client managing client server 303 may want to deploy special deals on a webpage associated with the client during traditionally slow periods in an attempt to generate more sales. As another example, a client may want to set an expiration date for a tag created to track a particular campaign so that even if an entity tasked with managing the tag forgets that it has been deployed, the tag/content management system 300 may stop serving the tag after conclusion of the campaign. One of ordinary skill in the art after review of the entirety disclosed herein would recognize numerous other ways of customized delivery of program instructions/content that are within the scope of the disclosure.

Whether data is being collected from a web browser or a non-browser application, the program instructions within the tag/content manager 204 may facilitate the collection of data such as mouse-overs, page loads, and mouse movements. The collection of data may occur when program instructions from third party vendors (e.g., Omniture, Webtrends, Yahoo, Google, etc.) are delivered in a timely fashion based on the rules that have been translated into program instructions by a code generator. The collected data may also include data generated by the client's backend server 303. For instance, a content management system (CMS) local to the client server 303 which manages a client's web page may generate various types of data (e.g., like what template a page is based upon, how long it took to render a page, etc.). This solution may also facilitate the collection of this type of data.

Once collected, the data may be processed in one of two ways. In the first scenario, the collected data may simply be routed to the appropriate third-party vendor (i.e., if an Omniture tag is delivered and executed, then the data collected from the execution of this tag would be routed to an Omniture server.) The third-party vendors may then process and analyze the collected data in a way of their choosing based on client needs.

Alternatively, the collected data may be routed back to and stored on the cloud 305 for access and analysis by computing resources in cloud 305 and/or other computing resources available local to an organization overseeing the creation and development of the tag manager 204. This collected data may be supplemented by collecting and storing additional data about a user of the user terminal 301 from call logs and transaction histories. In this scenario, the organization behind the tag/content manager 204 may provide even more value to its clients 303 because the organization would be providing both management and data analysis services.

The data analysis may encompass a variety of techniques, including data mining algorithms and multivariate testing. As suggested earlier, the output of the data analysis may be fed back into the system to generate new or modified rules (and thus, generate a modified tag manager 204 and/or page specific code files) for delivering program instructions and/or content to a user terminal 301. A simple example of data analysis may include the ability of the system to check to see if there are any records of a user that has loaded a client's web page (i.e., a return visitor). For instance, assume that a user is revisiting a website with the URL www.acme.com. The standard welcome message for first-time visitors to www.acme.com may read as, "Welcome to www.acme.com." If there is a record of a user John Doe having visited www.acme.com, the welcome message may then be modified to "Welcome back to www.acme.com John Doe."

In addition, security protocols (passwords, biometric scanning, motion detection, etc.) may be put in place to prevent unauthorized individuals from accessing and manipulating tag manger 204 and its associated helper programs either on the cloud 305 and/or on other computing facilities associated with the entity that develops and modifies the tag manager 204.

The entity generating/modifying the tag manger 204 and its associated components may also implement a front end display/communication module to report results of collected data, communicate recent news and events within the tag/content management and analysis fields, and/or interface with other data including logs from a call center system, offline sales data, offline marketing spend, and others. The front end display may allow access to much/all of the information/analysis generated through the implementation of the tag manager 204. Also, the front end display may allow clients 303 to easily add program instructions representing new rules (via check boxes, buttons, etc) to their web sites/products.

In addition, the interface may allow clients 303 to generate a tag manager program 204 with program instructions representing new rules for testing purposes. For instance, consider that an online retail store wishes to modify its tracking code to collect data on mouse movements for complete session replay. This new rule may be used to generate a modified tag manager 204 for the retail store. The modified tag manager 204 may include code for tracking mouse movements. To ensure that this newly inserted code does not "break" the site (i.e., cause the website to crash), the modified tag manager 204 may be sent only to a specific URL (i.e., a URL used specifically for testing the new code). All other URLs may receive the unmodified version of the tag manager 204. In this way, this implementation may help to dynamically create test environments for use by clients 303 in testing new code, content, and/or any other modifications to their websites, software products, etc.

In summary, tag manager 204 may provide a platform to asynchronously deliver program instructions and/or content to a web page/non-browser application. In other words, manager 204 should not interrupt the execution of the application upon which it has the power to act. As an example, if a user accidentally/intentionally implements a rule that endlessly loops, tag manager 204 may be modular and robust enough to continue to execute. In addition, manager 204 may handle potential errors gracefully (i.e., continuing to load the rest of the web page requested, letting a user decide on how to move forward, etc.).

The manager 204 may also make full use of any techniques that reduce latency for the end-user (e.g., via browser caching, etc.). As detailed in the description above, tag/content manager 204 may control, with a great deal of granularity, the order in which the code it is deploying executes. Through the implementation of a user-friendly web interface, the manager 204 may safely be accessible to non-technical users (e.g., no need for users to hand write XML rules files, no need for users to know JavaScript™/programming, etc.). Along these lines, the manager 204 may control workflow related to the deployment of code and impose constraints in any other way possible to prevent the execution of code that may be harmful (e.g., may cause the application to hang or abort prematurely, etc.) to the application in which the manager 204 is deployed.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
   receiving, at a server from a user terminal, a first request for first program instructions configured to execute on the user terminal, where the first request is generated in response to the user terminal loading a first data using an application;
   transmitting, to the user terminal by a computer processor of the server, the first program instructions, wherein the first program instructions comprise a tag manager configured to regulate execution of second program instructions at the user terminal including their order of execution, not executing them more than once, and their asynchronous execution;
   listening, by the tag manager on the user terminal, for predetermined events generated through the application on the user terminal;
   receiving, at the server, a second request for the second program instructions configured to execute on the user terminal, wherein the second request is generated in response to execution of the first program instructions, and the second request includes information about the first data loaded from the application on the user terminal;
   generating, by the computer processor of the server, the second program instructions comprising analytics tags by parsing the first data and evaluating whether the information about the first data satisfies at least one of a plurality of conditions to determine whether at least one set of a plurality of sets of program instructions corresponding to analytics tags should be delivered to the user terminal, wherein the analytics tags comprise a page load event document object model analytics tag;
   altering, by the tag manager on the user terminal, the order of execution of the analytics tags in the second program instructions at the user terminal in response to the generated predetermined events; and
   routing, from the user terminal to an entity, a second data that has been collected.

2. The method of claim 1, wherein the application is a non-browser application, the method further comprising: causing routing, from the user terminal to an entity, a second data that has been collected.

3. The method of claim 1, wherein the first data comprises a web page, and wherein the generated predetermined events being listened to by the tag manager comprise notification that a user completed a form on the web page, and the method further comprising:
   inserting, by the tag manager on the user terminal, an object in the web page in response to the notification that the user completed the form on the web page; and
   sending, to the user terminal by the server, the second program instructions.

4. The method of claim 3, wherein the second request includes a uniform resource locator (URL) of the web page.

5. The method of claim 4, wherein the URL comprises a host, path, file, query parameters, and hash, and wherein one of the plurality of conditions includes matching at least one of the host, path, file, query parameters, and hash with at least one predetermined value.

6. The method of claim 5, wherein the matching of the at least one of the host, path, file, query parameters, and hash with the at least one predetermined value occurs through a direct comparison.

7. The method of claim 5, wherein the matching of the at least one of the host, path, file, query parameters, and hash with the at least one predetermined value occurs through a comparison involving regular expressions.

8. The method of claim 1, wherein one of the plurality of conditions includes matching at least one of a plurality of Hypertext Transfer Protocol (HTTP) header fields with at least one predetermined value.

9. The method of claim 8, wherein the plurality of HTTP header fields are chosen from the group consisting of: a user agent field, a referrer field, and a cookie field.

10. The method of claim 3, wherein one of the plurality of conditions includes determining whether a predetermined Hypertext Markup Language object has been created on the web page accessed by the user terminal.

11. The method of claim 1, wherein one of the plurality of conditions includes determining whether a cookie is found for the user terminal on the server.

12. The method of claim 1, wherein one of the plurality of conditions includes determining whether the user terminal has a predetermined screen resolution and uses a predetermined scripting language version.

13. The method of claim 1, further comprising: receiving external data from an external data source, wherein the external data includes a geolocation of a user associated with the user terminal and test data related to whether or not a web-based rule has run enough times to reach statistical significance.

14. The method of claim 13, wherein one of the plurality of conditions includes determining if the geolocation of the user associated with the user terminal matches a predetermined location.

15. The method of claim 13, wherein one of the plurality of conditions includes determining if the web-based rule has run enough times to reach statistical significance, and the method further comprising:
transmitting the web-based rule to the user terminal when the web-based rule has not run enough times to reach statistical significance.

16. The method of claim 1, wherein one of the plurality of conditions includes a time at which the second request is made.

17. The method of claim 1, wherein the evaluating includes comparing a first value in the second request to a predetermined value.

18. A non-transitory computer-readable storage medium having computer-executable program instructions stored thereon that when executed by a processor, cause the processor to perform steps comprising:
creating rules for execution of program instructions on a user terminal;
using the rules, generating a manager program with first program instructions configured to execute on the user terminal upon receiving a first request from the user terminal, wherein the first request is generated in response to the user terminal downloading data using an application;
evaluating a plurality of conditions related to the user terminal, wherein the plurality of conditions include whether the user terminal is a mobile or stationary terminal, whether the application running on the user terminal is of a predetermined type, and whether the user terminal is in a predetermined location;
using the rules and based on the evaluation, generating page specific instructions comprising analytics tags, including a page load event document object model analytics tag, configured to execute on the user terminal upon receiving a second request, wherein the second request is generated in response to execution of the first program instructions;
wherein the manager program modifies an order of execution of the page load event document object model analytics tag with respect to the page specific instructions.

19. The computer-readable storage medium of claim 18, wherein the manager program is configured to regulate execution of page specific instructions at the user terminal including at least one of the page specific instructions order of execution and not executing the page specific instructions more than once.

20. The computer-readable storage medium of claim 19, wherein the manager program is further configured to regulate execution of page specific instructions at the user terminal including the asynchronous execution of the page specific instructions.

21. The computer-readable storage medium of claim 18, wherein the plurality of conditions further includes whether a cookie is found for the user terminal on the server.

22. The computer-readable storage medium of claim 18, storing computer-executable program instructions that when executed by the processor, cause the processor to perform steps further comprising:
receiving, as part of the evaluating the plurality of conditions related to the user terminal, external data from an external data source, wherein the external data includes a geolocation of the user terminal; and
determining, as part of the evaluating the plurality of conditions related to the user terminal, whether the geolocation of the user associated with the user terminal matches the predetermined location.

23. An apparatus comprising:
a computer processor;
a memory having stored therein computer executable instructions that, when executed by the computer processor, cause the apparatus to perform a method of:
transmitting, to a user terminal by the computer processor, a first program instructions, wherein the first program instructions comprise a tag manager configured to regulate execution of program instructions at the user terminal including their order of execution and their asynchronous execution;
during downloading of a web page on a webserver by a user terminal, receiving a request for page specific program instructions, wherein the request is generated in response to execution of the first program instructions on a user terminal, and wherein the web page comprises a page load event document object model analytics tag; and
transmitting, by the computer processor, the page specific program instructions to the user terminal, wherein the page specific program instructions are configured to execute on the user terminal in an order modified by the tag manager.

24. The apparatus of claim 23, wherein the memory further stores computer-executable instructions that, when executed by the computer processor, cause the apparatus to further perform steps comprising:
receiving data generated from the execution of the first and page-specific program instructions about activities of the user terminal during a visit to the web page.

25. The apparatus of claim 23, wherein the tag manager is configured to prevent execution of the first program instructions and the page specific program instructions on the user terminal when the tag manager detects that the execution is harmful to the user terminal.

* * * * *